United States Patent
Abe et al.

[11] Patent Number: 5,806,786
[45] Date of Patent: Sep. 15, 1998

[54] WEB ROLL CONTAINER

[75] Inventors: Hirofumi Abe; Hiroyuki Iwasa, both of Kanagawa, Japan

[73] Assignee: Fuji Photo Film Co., Ltd., Kanagawa, Japan

[21] Appl. No.: 916,237

[22] Filed: Aug. 22, 1997

[30] Foreign Application Priority Data

Aug. 23, 1996 [JP] Japan .................................. 8-222493

[51] Int. Cl.$^6$ .......................... G03B 23/02; B65D 85/02; B65D 85/66
[52] U.S. Cl. .................................. 242/588.6; 242/348.4; 206/397; 206/408; 206/416
[58] Field of Search ............................ 242/588.6, 588.5, 242/348, 348.4; 206/397, 408, 415, 416

[56] References Cited

U.S. PATENT DOCUMENTS

| | | | |
|---|---|---|---|
| 4,874,089 | 10/1989 | Matsuda et al. | 206/397 |
| 4,878,581 | 11/1989 | Beery | 206/416 |
| 5,332,169 | 7/1994 | Harris et al. | 206/397 X |

FOREIGN PATENT DOCUMENTS 4-45816  7/1992  Japan .

*Primary Examiner*—John Q. Nguyen
*Attorney, Agent, or Firm*—Sughrue, Mion, Zinn, Macpeak & Seas, PLLC

[57] ABSTRACT

A container, for example a photographic paper magazine, includes a core about which photographic paper is wound in a form of a roll. A container body contains the roll with the core in a rotatable manner. An outlet slit is formed in the container body and adapted to drawing out the photographic paper. First and second end walls are disposed on the container body, and confronted with respective end faces of the roll. First and second core supports are supported respectively on the first and second end walls, rotatable coaxially, and fitted on respective axial ends of the core. The core supports support the core between the end walls in a rotatable manner. A lock pin is fixedly secured to the first end wall. A hook is disposed on the first core support, is engageable with the lock pin in a resilient manner, and inhibits relative rotation between the hook and the lock pin, to retain the first core support on the first end wall. An arm is displaceable between a free state and a deformed state, and biases the hook. The arm, when the first core support is initially mounted on the first end wall, is bent to the deformed state, to engage the hook with the lock pin. When the first core support is rotated by drawing the photographic paper, the hook is disengaged from the lock pin, to allow the arm to bend back to the free state. The arm moves the hook to a position deviated from the lock pin, and avoids interference with the lock pin.

15 Claims, 6 Drawing Sheets

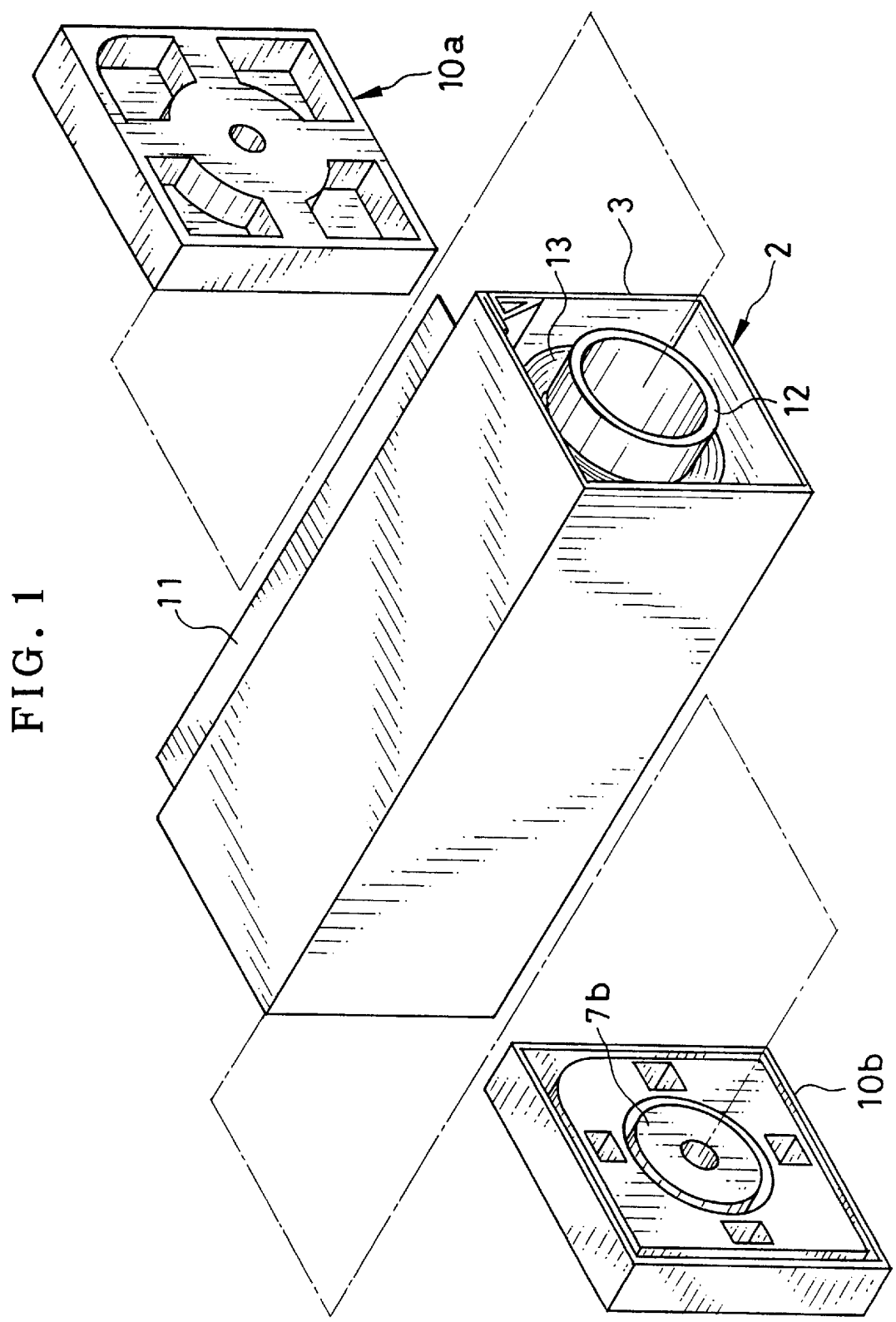

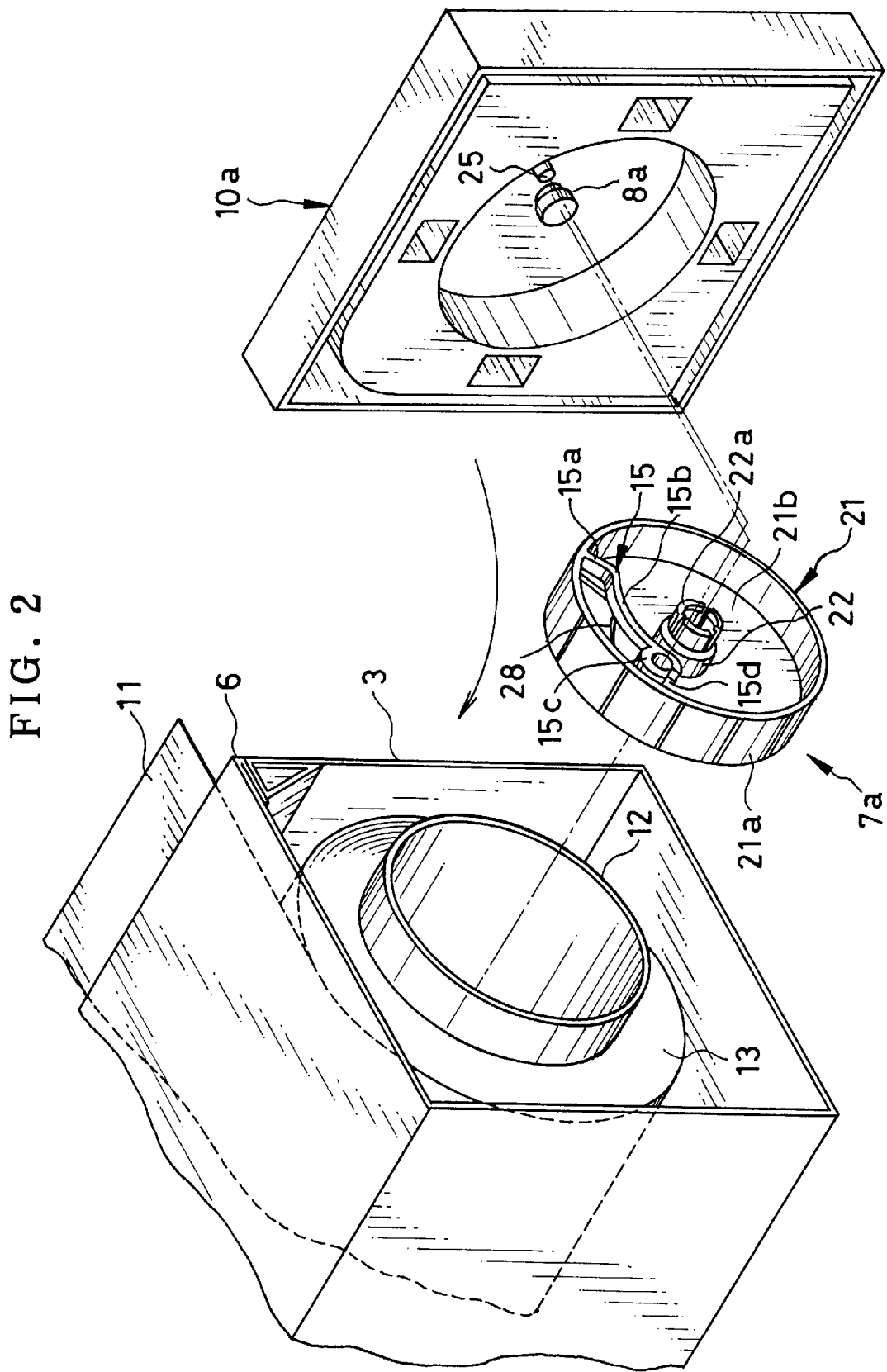

WEB ROLL CONTAINER

BACKGROUND OF THE INVENTION

1. Field of the Invention

The present invention relates to a web roll container. More particularly, the present invention relates to a web roll container for containing a roll of web or long sheet material and in which the roll is kept from being loosened before use.

2. Description Related to the Prior Art

There are elongated photo film and photographic paper for use with optical instruments. Elongated photo film is used for forming printing plates, phototypesetting, color photocopy and the like. Photographic paper is used in a photographic printer. Web or long sheet material, including elongated photo film and photographic paper, is supplied in a form wound about a spool or core as a roll. To supply any of the optical instruments with the web from the roll, a magazine or container is adapted to containing the roll in a rotatable manner.

The container has a container body, out of which the web is drawn through a passage port or outlet slit formed in the container body. The roll should be kept from being loosened before use even if shock or vibration occurs to the container in conveyance or transportation. To this end, there are various suggestions. For example, cellophane tape or a metal member is used to retain the core having the web on an end wall of the container. JP-B 4-45816 (corresponding to JP-A 2-226144) discloses a technique in which hot-melt adhesive agent is used to attach one of core supports provisionally to the container body of the container. Note that the core supports are used axially to support respective ends of the core between the end walls of the container body.

This use of the cellophane tape or metal member for retaining the core on the end wall, however, has a shortcoming of extreme difficulty in operation. The long sheet material is typically photosensitive, and requires a manufacturing line of a dark room for a loading step. Also the loading step is slow due to the darkroom operation, and inconsistent to heightening efficiency. In relation to the use of hot-melt adhesive agent between the core support for the core and the container body, there occurs a problem. Even after the core is released from the container body by peeling the hot-melt adhesive agent, there remains burr, minute roughness, or other residue of the hot-melt adhesive agent being peeled. The residue is obstructive in contact with the container body during rotation of the roll, so as to reduce stability in the unwinding movement of the web.

SUMMARY OF THE INVENTION

In view of the foregoing problems, an object of the present invention is to provide a web roll container for containing a roll of web or long sheet material, capable of preventing the roll unused inside the container from being loosened by means of a simple construction.

In order to achieve the above and other objects and advantages of this invention, a web roll container has a container body for containing a roll of web in a rotatable manner, and an outlet slit for advancing the web from the container body, the web being wound about a core in a form of the roll. The container includes first and second core supports, secured to the core, and supported on respective end walls of the container body in a rotatable manner. A lock pin is disposed on a first one selected from the first core support and a first one of the end walls. A hook member is engageable with the lock pin. A connector member connects the hook member to a second one selected from the first core support and the first one of the end walls, the connector member allowing engaging the hook with the lock pin to prevent the roll from rotating, and the connector member preventing the hook from interfering with the lock pin during rotation of the roll when the hook is disengaged from the lock pin.

In a preferred embodiment, a hook of a clip member is disposed on a second one selected from the first core support and the first end wall, engageable with the lock pin in a resilient manner, for inhibiting relative rotation between the hook and the lock pin, to retain the first core support on the first end wall. An arm is displaceable between a free state and a displaced state, for biasing the hook, the arm, when the first core support is initially mounted on the first end wall, being displaced to the displaced state, to engage the hook with the lock pin, and when the core and the first core support are rotated by drawing the sheet material, the hook being disengaged from the lock pin, displaces the arm back to the free state, whereby the arm moves the hook to a position deviated from the lock pin, for avoiding interference with the lock pin.

Furthermore, the arm has resiliency, connects the hook to the second one selected from the first core support and the first end wall, and is resiliently deformable between the free state and the displaced state.

The web is photographic paper.

The hook has a cutout. The cutout is open in one rotational direction.

The core includes first and second axial holes, formed respectively in the axial ends thereof, respectively for receiving the first and second core supports fitted therein.

The hook and the arm are formed integrally with the first core support, and the lock pin is formed integrally with the first end wall.

The hook is disposed in a winding rotational direction as viewed from the arm. The winding rotational direction is reverse to unwinding of the web from the roll.

The cutout is open in the winding rotational direction, and has a width smaller than a diameter of the lock pin.

The first core support includes a tubular portion, formed by cutting a surface confronted with the first end wall, the arm being formed integrally with an inner cylindrical surface of the tubular portion. The arm, when displaced to the displaced state, is deformed toward an axis of the first core support, and when displaced back to the free state, moves the hook away from the axis.

The first core support is molded from resin, and includes an arc-shaped opening, formed therethrough in an axial direction behind the hook and the arm, having a periphery of a size covering the hook and the arm, for facilitating onetime molding of the hook, the arm and the tubular portion.

The first end wall includes a receiving shaft disposed to protrude along the axis of the first core support. A thickened portion is disposed about a distal end of the receiving shaft, and has a diameter greater than the receiving shaft. The first core support includes plural receiving plates, arranged about the axis, combined to define a substantially cylindrical shape, disposed to protrude toward the first end wall, for supporting the receiving shaft therebetween in a rotatable manner. Plural claws are disposed on respective distal ends of the plural receiving plates, protruded toward one another, for preventing the thickened portion from dropping from between the plural receiving plates, so as to combine the first core support with the first end wall before engagement between the first core support and the core.

BRIEF DESCRIPTION OF THE DRAWINGS

The above objects and advantages of the present invention will become more apparent from the following detailed description when read in connection with the accompanying drawings, in which:

FIG. 1 is an exploded perspective illustrating a web roll container of the present invention;

FIG. 2 is an exploded perspective, partially cutaway, illustrating a core support and an end wall with a spool or core, all included in the container;

DETAILED DESCRIPTION OF THE PREFERRED EMBODIMENTS OF THE PRESENT INVENTION

Figure 2A:
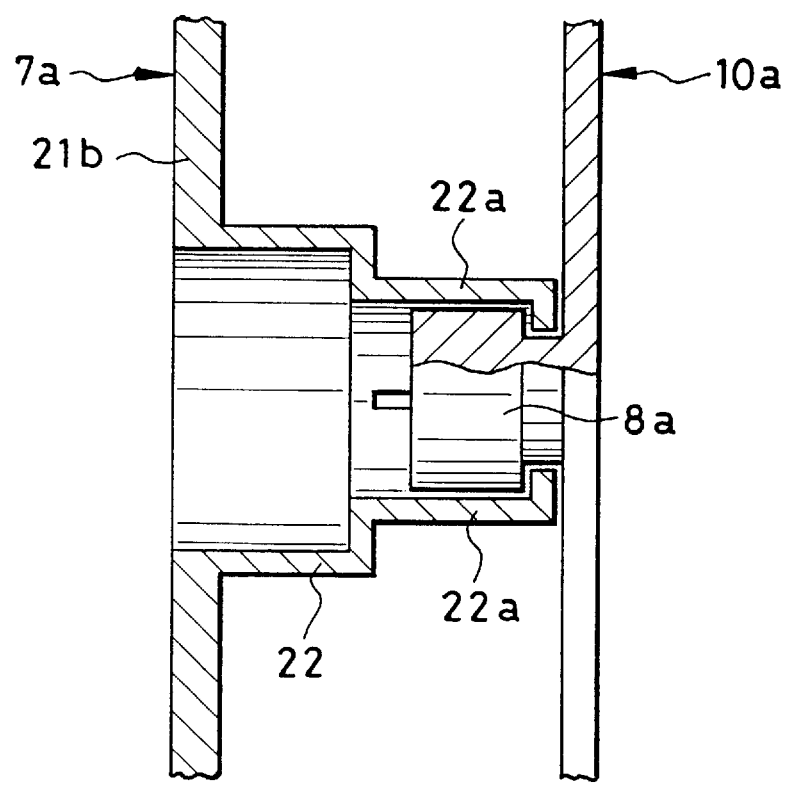
FIG. 2A is a cross section, partially cutaway, illustrating central portions of the core support and the end wall.

In FIG. 1, a photographic paper magazine or container 1 is illustrated. The container 1 (see FIG. 3A) has a shape of a substantially rectangular parallelepiped. A container body 2 of the container 1 is constituted by peripheral walls or main body 3 and end walls 10a and 10b or caps. The main body 3 is formed from cardboard having a dark color and light-shielding property. The end walls 10a and 10b close respective open ends of the main body 3. In a top portion of the main body 3 is formed a passage port or outlet slit 6 through which photographic paper 11 as sheet material is drawn out.

The end walls 10a and 10b are fitted on respective ends of the main body 3. There is a receiving shaft 8a (see FIG. 2) formed on the end wall 10a for supporting a core support 7a in a rotatable manner. The core support 7a is described later in detail. Also another receiving shaft (not shown) is formed on the end wall 10b for supporting a core support 7b in a rotatable manner. A lock pin 25 is formed with an inner face of the end wall 10a, and engageable with a hook 15c of a clip member 15, to be described later.

The photographic paper 11 is wound about a spool or core 12 in a form of a roll 13. The core 12 has two ends having respective holes, into which the core supports 7a and 7b are respectively fitted in a tight manner. Then the roll 13 is supported between the end walls 10a and 10b by the virtue of the core supports 7a and 7b.

In FIGS. 2 and 2A, the relationship of the core support 7a and the end wall 10a is illustrated. The core support 7a includes a tubular portion 21 and an axial tubular portion 22. The tubular portion 21 is pressed into one end hole of the core 12. The axial tubular portion 22 is located in the center of the tubular portion 21. The axial tubular portion 22 has plural receiving plates 22a for avoiding drop of the core support 7a from the end wall 10a. The receiving plates 22a are engaged with the receiving shaft 8a of the end wall 10a in a rotatable manner, so that the core support 7a is secured to the end wall 10a in a rotatable manner.

The tubular portion 21 includes an inner cylindrical surface 21a, a connecting wall 21b and the clip 15. The inner cylindrical surface 21a has a ring shape. The connecting wall 21b is formed integrally with the inner cylindrical surface 21a, and has an arc-shaped opening 28. The clip 15 is formed integrally with the inner cylindrical surface 21a. The clip 15 includes a proximal end 15a, a bias arm 15b and the hook 15c. The proximal end 15a is directly connected with the inner cylindrical surface 21a. The arm 15b extends from the proximal end 15a in a curved shape. The hook 15c is formed integrally with the arm 15b. A direction in which the arm 15b extends is opposite to a direction in which the core support 7a is rotated during outward unwinding of the photographic paper 11.

The hook 15c is in a ring shape, and has a cutout 15d, which is engaged with the lock pin 25 protruding on the end wall 10a. A width by which the cutout 15d is open is smaller than a diameter of the lock pin 25. When the hook 15c is disengaged from the lock pin 25, the hook 15c is resiliently spread with the width lengthened.

The hook 15c, when disengaged from the lock pin 25, comes nearer to the inner cylindrical surface 21a. When the hook 15c is engaged with the lock pin 25, the arm 15b is in a deformed state and nearer to the axial tubular portion 22. The core support 7b does not have the clip 15. Except for the clip 15, the core support 7b has the same shape as the core support 7a. Note that the arc-shaped opening 28 formed in the connecting wall 21b makes it possible to form the core support 7a from resin with great ease in a manner inclusive of the clip 15 and the connecting wall 21b.

The operation of the container 1 is hereinafter described. In a factory, the container body 2 of the container 1 is loaded with the roll 13. At first, the receiving shaft 8a of the end wall 10a is pressed into the axial tubular portion 22 of the core support 7a, to secure the core support 7a to the end wall 10a in a rotatable manner. The core support 7b is also secured to the end wall 10b in a rotatable manner. The end wall 10b with the core support 7b is previously mounted on the container body 2, before the roll 13 is inserted into the container body 2. The tubular portion 21 of the core support 7b is pressed into one end hole of the core 12.

The roll 13 is rotated to advance a small leading portion of the photographic paper 11 outwards through the outlet slit 6. The arm 15b of the clip 15 is pushed and curved towards the axis from the inner cylindrical surface 21a of the core support 7a mounted on the end wall 10a. The hook 15c is engaged with the lock pin 25. Finally the end wall 10a is secured to the container body 2. The tubular portion 21 of the core support 7a is pressed into a second end hole of the core 12, to finish loading the container body 2 with the roll 13.

The roll 13 contained in the container 1 is retained on the end wall 10a via the lock pin 25 and the clip 15. Even when shock or vibration occurs to the container 1 being conveyed or transported, the roll 13 is kept from being rotated inadvertently. There is no incident of loosening the roll 13 inside the container 1 before being used, or wrinkling or folding the roll 13.

Figure 3A:
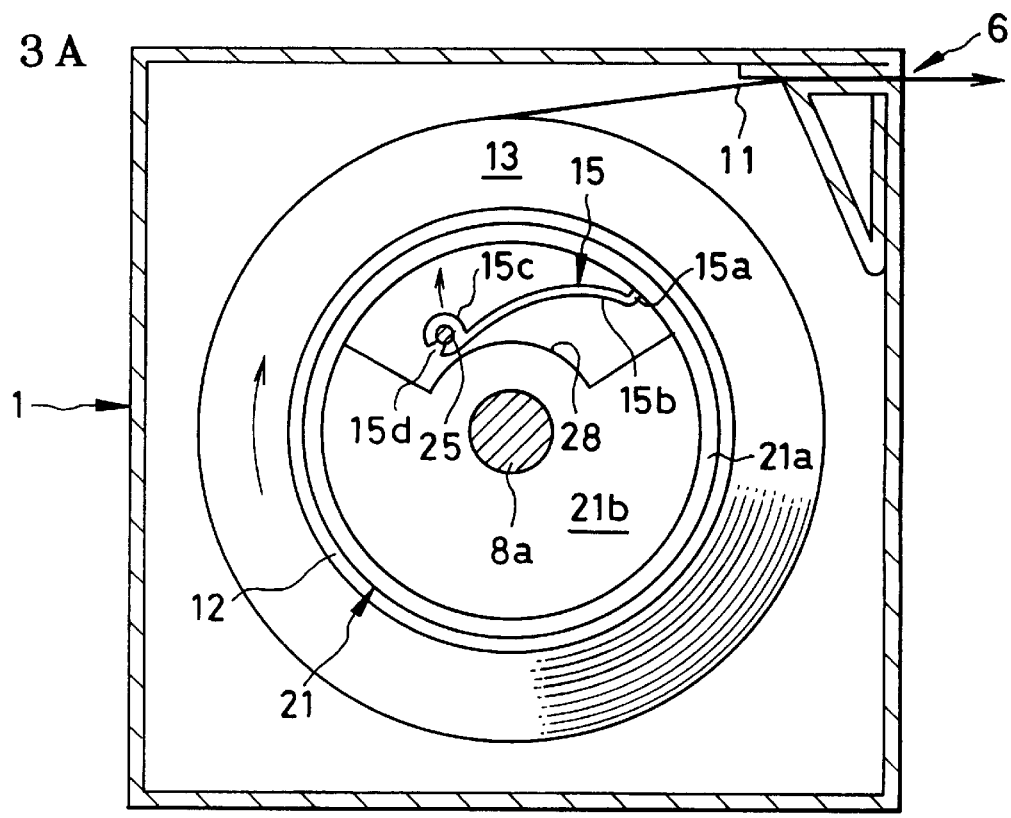
FIG. 3A is a cross section illustrating a state where a hook is engaged with a lock pin in the container.
Figure 3B:
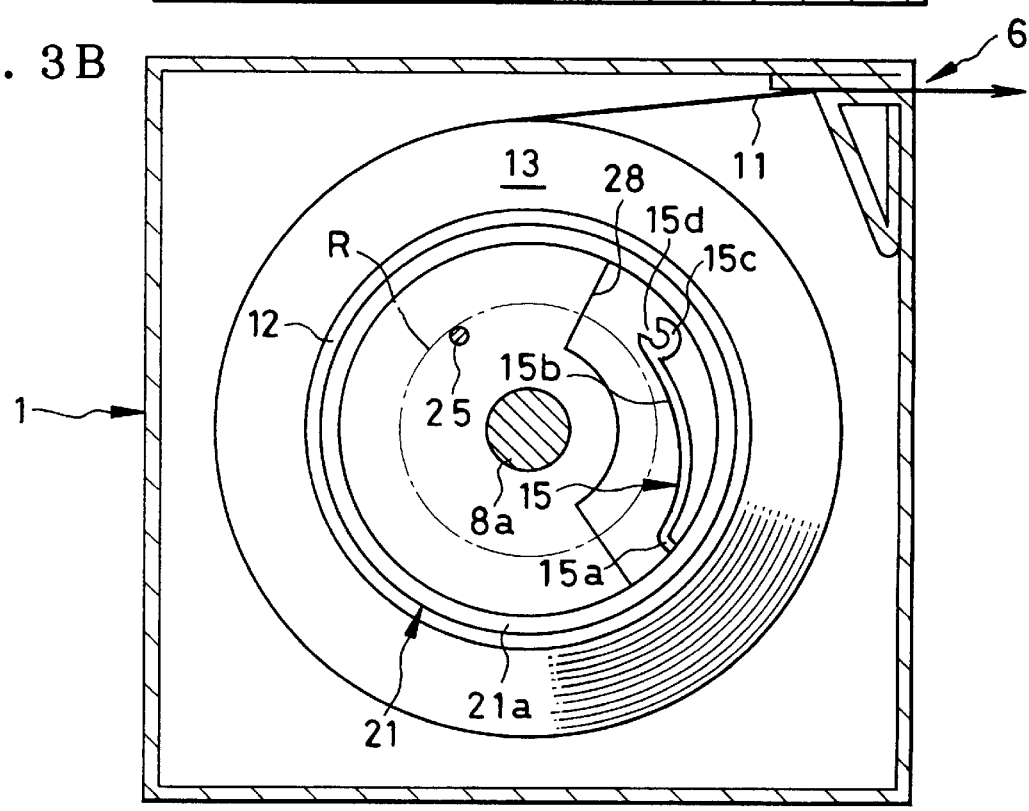
FIG. 3B is a cross section illustrating a state where the hook comes disengaged from the lock pin.

In FIGS. 3A and 3B, steps of operation of the container are depicted. To use the container 1, the container 1 is set into an instrument prepared for use with the container 1. To supply the photographic paper 11 into the instrument, the photographic paper 11 is drawn out in a state where the roll 13 is kept fixed inside the container body 2 by means of the lock pin 25 and the clip 15. See FIG. 3A.

When the photographic paper 11 is drawn from the outlet slit 6, the roll 13 rotates in a clockwise direction in FIGS. 3A and 3B. The clip 15 formed integrally with the inner cylindrical surface 21a of the core support 7a also rotates in the clockwise direction. The lock pin 25 on the end wall 10a is moved away from the hook 15c while spreading the cutout 15d, so that the roll 13 becomes rotatable relative to the container body 2. Upon disengagement of the lock pin 25 from the hook 15c, the arm 15b abruptly shifts radially outwards by its own resiliency. The clip 15 is shifted back to its free state and near to the inner cylindrical surface 21a. If the core support 7a is rotated by advancement of the photographic paper 11, the clip 15 does not contact on the lock pin 25 as indicated in the phantom line R in FIG. 3B. The roll 13 smoothly rotates without interference.

EXAMPLE

Figure 4:
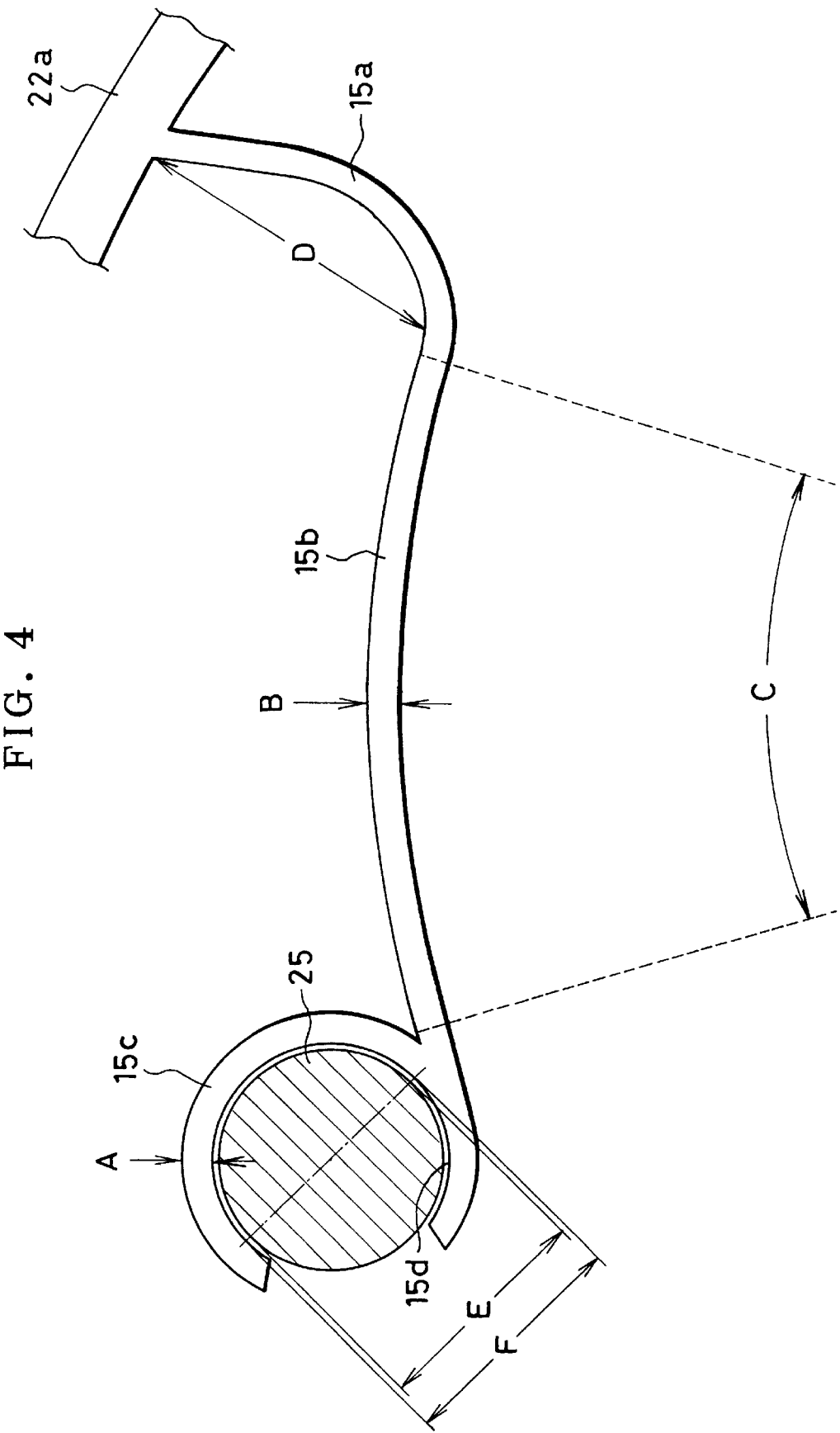
FIG. 4 is an explanatory view in elevation, illustrating a relationship between a clip and the lock pin.

In FIG. 4, an example of the lock pin 25 and the clip 15 is illustrated. In FIG. 4, a sign A designates thickness of the hook 15c. A is in a range of 0.2–1 mm, preferably 0.3–0.7 mm, more preferably 0.4–0.6 mm. In the present example, A is determined as 0.5 mm. Should the hook 15c be too thick, the lock pin 25 could not be disengaged from it. Should the hook 15c be too thin, the lock pin 25 would be disengaged from it very readily, typically when the container 1 receives a shock or vibration.

In FIG. 4, a sign B designates thickness of the arm 15b. B is in a range of 0.3–3 mm, preferably 0.3–2 mm, and more preferably 0.5–1 mm. In the present example, B is determined as 0.7 mm. The arm 15b can be thick with advantages in rigidity. Should the arm 15b be too thick, however, the arm 15b would be likely to deform after being engaged with the lock pin 25 for a long time. The arm 15b would not recover a position away from the lock pin 25 even when disengaged from the lock pin 25. Should the arm 15b be too thin, the arm 15b would be broken typically when the container 1 receives a shock or vibration.

In FIG. 4, a sign C designates a curving angle within which the arm 15b is curved. C is in a range of 10–170 degrees, preferably 30–150 degrees, and more preferably 45–135 degrees. The length of the arm 15b depends upon a diameter of the tubular portion 21. When the diameter of the tubular portion 21 is two (2) inches and the curing angle is 120 degrees, the arm 15b is 50 mm long. When the diameter of the tubular portion 21 is three (3) inches and the curving angle is 60 degrees, the arm 15b is 40 mm long. Should the arm 15b be too short, the arm 15b would be likely to have plastic deformation without recovery of the shape.

In FIG. 4, a sign D designates a length of the proximal end 15a. D is in a range of 3–10 mm, preferably 3–7 mm, and more preferably 3–5 mm. In the present example, D is determined as 4 mm. A lower limit of the length D of the proximal end 15a is set sufficient for a molding operation. An upper limit of the length D of the proximal end 15a is set small enough for not influencing mold ability of the clip 15 even with prolongation of the arm 15b.

In FIG. 4, a sign E designates a diameter of the lock pin 25. E is in a range of 0.5–5 mm, preferably 1–3 mm, and more preferably 1.2–2 mm. In the present example, E is determined as 1.5 mm. Should the diameter of the lock pin 25 be too small, the lock pin 25 would be broken upon disengagement from the hook 15c or by external shock to the container 1. Should the diameter of the lock pin 25 be too great, the lock pin 25 would be involved with a problem of a sink mark in the course of molding.

In FIG. 4, a sign F designates an inner diameter of the hook 15c. A difference between F and E is in a range of ±0.5 mm, preferably ±0.3 mm, and more preferably ±0.2 mm. In the present example, (F–E) is determined as −0.15 mm. Should the inner diameter of the hook 15c be smaller than its lower limit, the hook 15c would be engaged with the lock pin 25 too tightly. Force required for releasing the core retention would be varied between products of the container 1. Should the inner diameter of the hook 15c be greater than its upper limit, the hook 15c would be too loosely engaged with the lock pin 25, to loosen the roll 13.

Figure 5A:
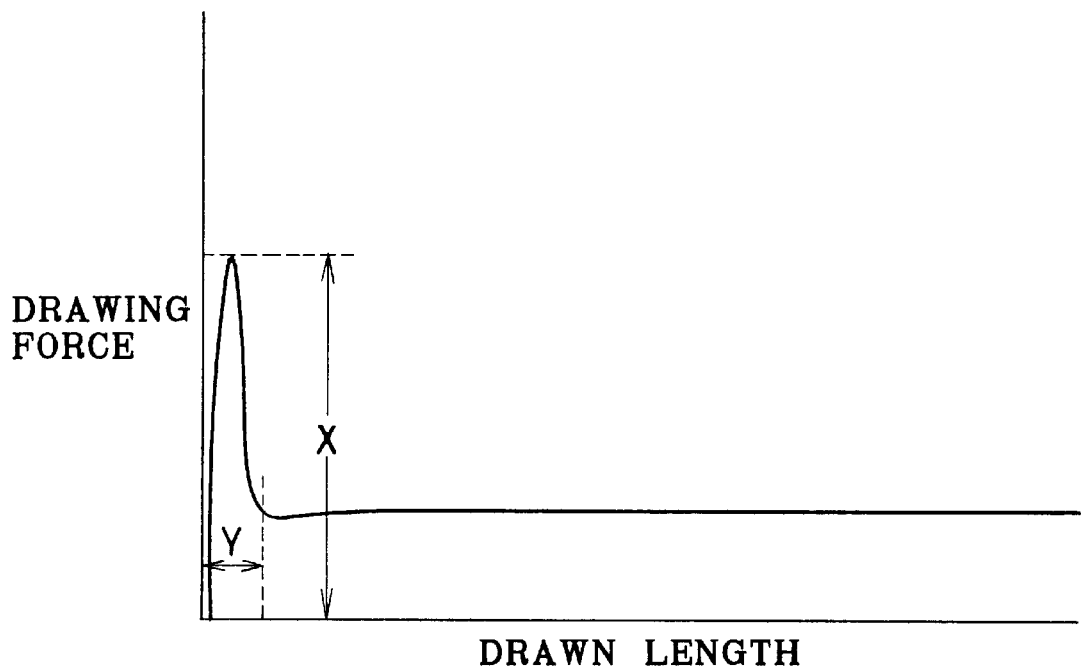
FIG. 5A is a graph illustrating a relationship between a drawing force and a drawn length of photographic paper in releasing the core retention.
Figure 5B:
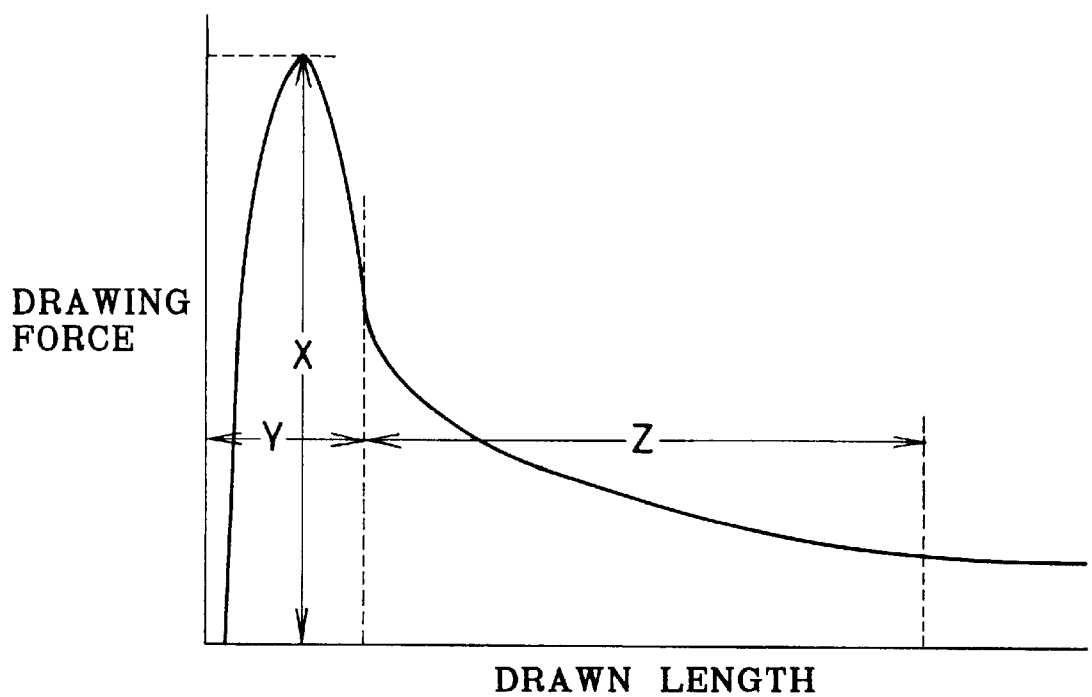
FIG. 5B is a graph illustrating a relationship between the drawing force and the drawn length in releasing the core retention according to the prior art.

In FIG. 5B, a relationship between drawing force and a drawn length is illustrated in relation to releasing a core retention according to the prior art, for example U.S. Pat. No. 4,874,089 (corresponding to JP-A 1-121852). A sign X designates force required for releasing the core retention by forcibly peeling hot-melt adhesive agent. As a result of an experiment, X was 500–3,000 grams, and differed between products of photographic paper magazines. This was because the hot-melt adhesive agent is characteristically soft under a high temperature, to lower the releasing force for the core retention. A sign Y designates a length of a portion of the photographic sheet required for releasing the core retention. Under a high temperature, Y was also great. A sign Z designates a length of a portion of the photographic sheet influenced by the core retention. As influenced by Y being great, Z was great.

The hot-melt adhesive agent, when preserved under a low temperature, characteristically comes to have similarity to glass. With the core retention according to the prior art, X was great, with Y and Z being small. Due to differences of the hot-melt adhesive agent between lots in the manufacturing line, it was extremely difficult to regulate the values of X, Y and Z even when the temperature was kept constant between the lots. With the core retention according to the prior art, Y needed to be 30–60 centimeters. Thus Z was as much as 1–5 meters. Also there occurred an irregularity in the whole operation of drawing the photographic paper 11 due to the residue of the hot-melt adhesive agent being peeled. Specifically there remained a useless waste portion of the photographic paper 11 which is photosensitive, because the waste portion to the extent of the value B had been fogged by ambient light and must be discarded. The greatness of B caused low efficiency.

In FIG. 5A, a relationship between the drawing force and the drawn length is illustrated in relation to releasing the core retention according to the present invention. Y is 5 centimeters or less. The core retention of the present invention, unlike the hot-melt adhesive agent, does not influence the drawing movement of the photographic paper after the release of the core retention. Consequently Z=0 (zero). It is possible to reduce a waste amount of the photographic paper to zero (0) or a very small value near to zero. Also X can be determined small, to reduce excessive load required for releasing the core retention.

In the above embodiment, the end wall 10a has the lock pin 25. The core support 7a has the hook 15c. Alternatively it is possible to dispose the hook 15c on the end wall 10a and dispose the lock pin 25 on the core support 7a. Furthermore the lock pin 25 or the hook 15c may be formed with a portion of the container body 2 different from the end wall 10 a or 10b. The hook 15c may be protruded from the core support 7a in an axial direction toward the end wall 10a. The arm 15b of the clip 15 may be straight without curvature. The lock pin 25 may be hollow. Tips of the hook 15c of the clip 15 may be rounded off.

In the above embodiment, the clip 15 is used only on the core support 7a. Note that the clip 15 may be used for both the core supports 7a and 7b. In the above embodiment, the arm 15b is resiliently deformed to shift the hook 15c. Alternatively a coil spring with a resilient characteristic may used to shift the hook 15c. The arm 15b may lack the resilient characteristic, may be rigid, and may be connected in a rotatable manner via a hinge portion integrally formed with a small thickness.

In the above embodiment, the photographic paper as long sheet material or web is contained in the container 1. Alternatively a container of the present invention may contain thermal recording sheet material, normal sheet material, resin sheet material, and other web.

In the above embodiment, the one open end of the core 12 is directly inserted in the one recess of the end wall 10a or 10b in a rotatable manner. Alternatively it is possible not to insert the one open end of the core 12 in the one recess of the end wall 10a or 10b. One half of the tubular portion 21 of the core support 7a may be tightly fitted in the one open end of the core 12. Another half of the tubular portion 21 of the core support 7a may be inserted in the one recess of the end wall 10a or 10b in a rotatable manner, while the open ends of the core 12 are kept with a space from the end walls 10a and 10b.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A web roll container, having a container body for containing a roll of web in a rotatable manner, and an outlet slit for advancing said web from said container body, said web being wound about a core in a form of said roll, said container comprising:

first and second core supports, secured to said core, and supported on respective end walls of said container body in a rotatable manner;

a lock pin disposed on a first one selected from said first core support and a first one of said end walls;

a clip member disposed on a second one selected from said first core support and said first one of said end walls, said clip member including a hook engageable with said lock pin and a resilient arm displaceable between a resiliently deformed state and a free state, said arm being in said deformed state when said hook is engaged with said lock pin to prevent said roll from rotating, and said arm being moved to said free state when said hook is disengaged from said lock pin, for preventing said hook from interfering with said lock pin during rotation of said roll.

2. A web roll container as defined in claim 1, wherein said hook is structured so that said hook is disengaged from said lock pin with resilient deformation when said roll is rotated in an unwinding direction while said web is drawn from said container body.

3. A web roll container as defined in claim 2, wherein said container body includes a main body and a first and a second side caps fitted on respective ends of said main body to constitute said end walls, said first side cap being confronted with said first core support, and said second side cap being confronted with said second core support.

4. A web roll container as defined in claim 3, wherein said lock pin is disposed on said first side cap, and said clip member is disposed on said first core support.

5. A web roll container as defined in claim 4, wherein said arm has a cantilever shape including a free end, and said free end is directed in a winding direction reverse to said unwinding direction.

6. A web roll container as defined in claim 5, wherein said hook is formed on said free end of said arm.

7. A web roll container as defined in claim 6, wherein said hook has a cutout being open in said winding direction, and said cutout has a width smaller than a diameter of said lock pin, and said lock pin is moved out of said cutout when said roll is rotated in said unwinding direction.

8. A web roll container as defined in claim 7, wherein said core has two cylindrically open ends, said first and second core supports are pressed respectively into said open ends, and said open ends of said core protrude from said roll.

9. A web roll container as defined in claim 8, wherein said first core support includes a tubular portion fitted in said core, an axial tubular portion formed in a center of said tubular portion, and a connecting portion for interconnecting said tubular portion and said axial tubular portion, said arm of said clip member protruding from an inside of said tubular portion;

said first side cap includes a recess in which an end of said core is received, and a receiving shaft, disposed in a center of said recess, and received in said axial tubular portion in a rotatable manner, said lock pin being disposed in said recess.

10. A web roll container as defined in claim 9, wherein said arm has a proximal end portion and a remaining portion, said proximal end portion extends toward said axial tubular portion, and said remaining portion is curved with a rotational locus of said lock pin.

11. A web roll container as defined in claim 10, wherein said first core support and said clip member are molded as one plastic piece.

12. A web roll container as defined in claim 11, wherein said first side cap and said lock pin are molded as one plastic piece.

13. A web roll container as defined in claim 12, wherein a groove is formed in a periphery of said receiving shaft, and a circular projection is disposed on a tip of said axial tubular portion, and inserted in said groove.

14. A web roll container as defined in claim 13, wherein said web is photographic paper.

15. A web roll container, having a container body for containing a roll of web in a rotatable manner, and an outlet slit for advancing said web from said container body, said web being wound about a core in a form of said roll, said container comprising:

first and second core supports, secured to said core, and supported on respective end walls of said container body in a rotatable manner;

a lock pin disposed on a first one selected from said first core support and a first one of said end walls;

a hook member engageable with said lock pin; and a means for connecting said hook member to a second one selected from said first core support and said first one of said end walls so that said hook member is movably mounted thereto, said connecting means allowing engagement of said hook with said lock pin to prevent said roll from rotating, and said connecting means preventing said hook from interfering with said lock pin during rotation of said roll when said hook is disengaged from said lock pin.

* * * * *